E. H. COWDRICK.
BOUQUET HOLDER.
APPLICATION FILED JULY 24, 1909.

968,452.

Patented Aug. 23, 1910.

Witnesses
William G. Linton.
D. W. Gould

Inventor
Erma H. Cowdrick.
By Victor J. Evans.
Attorney

UNITED STATES PATENT OFFICE.

ERMA H. COWDRICK, OF ALLEGHENY, PENNSYLVANIA.

BOUQUET-HOLDER.

968,452. Specification of Letters Patent. Patented Aug. 23, 1910.

Application filed July 24, 1909. Serial No. 509,300.

*To all whom it may concern:*

Be it known that I, ERMA H. COWDRICK, a citizen of the United States, residing at Allegheny, in the county of Allegheny and State of Pennsylvania, have invented new and useful Improvements in Bouquet-Holders, of which the following is a specification.

The invention relates to an improvement in holders for bouquets or the like and is particularly directed to a construction combining the convenience of the safety pin connection and a holder for supporting the bouquet in an upright position without piercing the stems of the flowers.

The main object of the invention is the provision of a bouquet holder constructed of a single length of material and involving a safety pin connector and spaced holding strands, which latter in use are designed to overlie the stem or stems of the flowers and support them in desired position.

The invention will be described in the following specification, reference being had particularly to the accompanying drawings, in which:—

Figure 1:
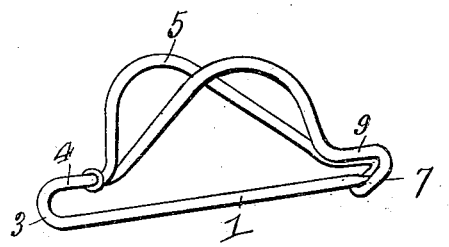
Figure 2:
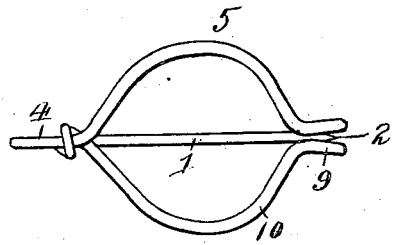
Figure 3:
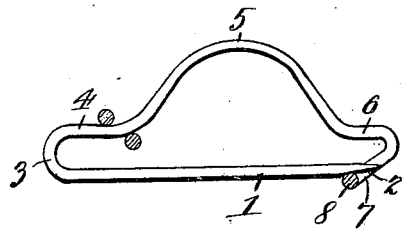

Figure 1 is a perspective of the bouquet holder. Fig. 2 is a plan of the same. Fig. 3 is a central longitudinal section with the pin bar in elevation.

Referring particularly to the accompanying drawings, my improved bouquet holder is constructed of a single length of material, preferably wire, formed at one end to provide a pin bar 1 having the usual piercing terminal 2. From the rear end of the pin bar the material of which the holder is constructed is bent to form a return bend 3 including a short length 4 in spaced parallel relation to and in vertical alinement with the pin bar. The section 4 is of materially less length than the length of the pin bar and at its forward end the wire length is bent upwardly and laterally to form a holding strand 5, the longitudinal dimension of the strand together with that of the section 4 being approximately of slightly less length than the full length of the pin bar. From the forward length of the holding strand the material is projected forward in approximate alinement with the pin bar, as at 6, and then downwardly and rearwardly into U-form, as at 7, the cross bar 8 of the U-form construction serving to receive the forward end of the pin bar and with the side portions of the U-form construction serving as a keeper for the forward end of the pin bar. From the keeper 7 the material is projected rearwardly, as at 9, duplicating the portion 6, and in a horizontal plane therewith, and from the rear end of the portion 9 the material is bent upwardly and laterally to form a second holding strand 10, the terminal of which extends to and is coiled about the section 4 of the holder adjacent its connection with the holding strand 5.

It will be noted that the respective holding strands 5 and 10 are disposed on opposite sides of the pin bar when viewed in plan and are of uniform curvature so as to provide two holding members curved from the respective ends of the pin bar and spaced apart their maximum distance at their highest point of curvature.

In use the holder is connected to the garment in the usual way by means of the pin bar 1, in which position it is assumed that the sections 4, 6, and 9 of the holder will rest in more or less close proximity to the garment, while holding strands 5 and 10 will project or curve outwardly from the garment surface and gradually increase the spacing distance between them from the points adjacent the garment to the relatively remote or central point of said holding strands. An approximately rounded space is thus provided in which the stem or stems of the flowers may be conveniently inserted and held, the comparatively wide relative spacing of the holding strands 5 and 10 preventing the stems from tilting and thereby displacement of the bouquet from the initially applied position.

The holder is of simple construction and may be constructed of such fine material as to be practically invisible when in use. Furthermore, the necessity of piercing the stems of the flowers with the consequent disadvantages is entirely avoided and the bouquet is maintained at all times in applied position.

Having thus described the invention what is claimed as new, is:—

A bouquet holder constructed of a single length of material formed to provide a safety pin, projected from one end of said pin to form a curved holding strand, projected from said strand to form a keeper for the pin bar, projected from said keeper to form a second curved holding strand, and connected at the terminal of said second holding strand to the first mentioned holding strand, said holding strands being arranged on opposite sides of the plane of the pin bar and projected wholly beyond and in the same direction from said bar, the strands being of gradually increased relative spacing from said pin bar to the point of highest curvature of the strands.

In testimony whereof I affix my signature in presence of two witnesses.

ERMA H. COWDRICK.

Witnesses:
PERCY J. HARBAUGH,
J. E. CARPENTER.